US006343166B1

(12) United States Patent
Hellman et al.

(10) Patent No.: US 6,343,166 B1
(45) Date of Patent: Jan. 29, 2002

(54) THREE-PORT FILTER AND METHOD OF MANUFACTURE

(75) Inventors: Scott M. Hellman, Aliso Veijo, CA (US); Kurt R. Francis, Yuma, AZ (US); Michael Uschinsky, Irvina; Heinrich G. O. Muller, Culver City, both of CA (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/599,168

(22) Filed: Jun. 22, 2000

(51) Int. Cl.$^7$ ................................................. G02B 6/32

(52) U.S. Cl. .............................. 385/31; 385/33; 385/34; 385/35; 385/59; 385/60; 385/80

(58) Field of Search ............................... 385/24, 31–34, 385/41, 42, 45, 60–62, 78–80, 84–85, 90–94

(56) References Cited

U.S. PATENT DOCUMENTS

| | | | |
|---|---|---|---|
| 5,502,781 A | 3/1996 | Li et al. | 385/4 |
| 5,604,629 A | 2/1997 | Hunter et al. | 359/359 |
| 5,615,052 A | 3/1997 | Doggett | 359/811 |
| 5,768,458 A | 6/1998 | Ro et al. | 385/79 |
| 5,799,121 A | 8/1998 | Duck et al. | 385/47 |
| 6,168,319 B1 * | 1/2001 | Francis | 385/79 |
| 6,282,339 B1 * | 8/2001 | Zheng | 385/34 |

OTHER PUBLICATIONS

"On the Theory of Termal Stresses in a Thin Bonding Layer" *Journal Applied Physics*, 1995, vol. 78, (11) p. 6826–6832.

"Deformation of Optical Surfaces by Film Stress" *Journal of Vacuum Science and Technology*, 1969, vol. 6, No. 1, p. 145–147.

* cited by examiner

*Primary Examiner*—Brian Healy
*Assistant Examiner*—Kevin S Wood
(74) *Attorney, Agent, or Firm*—Juliana Agon

(57) ABSTRACT

A method of manufacturing a filter includes the steps of positioning a collimator assembly including a GRIN lens mounted thereto in a movable fixture, placing a UV or thermally curable adhesive on the periphery of the GRIN lens, moving the GRIN lens into engagement with a filter holder having a filter mounted therein, micro-tilting the filter holder while monitoring the input and output signals of the fibers coupled to the GRIN lens for insertion loss less than about 0.1 dB, and applying UV radiation through the filter end of the filter holder to initially cure the aligned subassembly. In a preferred embodiment, the resultant subassembly is subsequently stress relieved and thoroughly cured. In another embodiment, UV radiation is applied to the filter holder GRIN lens interface through one or more apertures formed in the side of the filter holder. An optical filter has an input ferrule with an input cone having an axial length greater than about 3 mm to reduce S-bending of input fibers, thereby minimizing resultant insertion losses. The filter includes a holder with an annular seat formed in one end for receiving a filter and a lens-receiving aperture at an opposite end which allows micro-tilting of the filer holder to provide an alignment at an angle of less than about 1° to the axis of the GRIN lens.

25 Claims, 5 Drawing Sheets

THREE-PORT FILTER AND METHOD OF MANUFACTURE

BACKGROUND OF THE INVENTION

1. Field of the Invention

The present invention relates to an optical filter assembly and its method of manufacture.

2. Technical Background

Multiple-port, filtering and isolating packages are widely used in local and long distance optical telecommunication networks. These networks comprise various spectral shaping and isolating optical filter assemblies as parts of dense wavelength division multiplexing (DWDM) systems. The necessity to design reliable filters for such systems, which are subject to various thermal and mechanical loads during their 20 to 25 year lifetime, is of significant importance. A typical filter assembly comprises two (input and output) optical glass fibers inserted into a dual-capillary ferrule to produce a fiber-ferrule sub-assembly, a grated index (GRIN) lens, a spectral shaping (isolating) glass filters. The optical components of the assembly are embedded into an insulating glass tube, which in turn is mechanically protected by the metal housing (enclosure). In a typical 3-port package the above dual-fiber filter assembly is combined with the output collimating assembly leading to single optical fiber. The filter assemblies have been known, exhibit excessive insertion losses due to the coupling of the input fibers to the ferrule and the subsequent alignment of the collimator to the spectral shaping or isolating filter have been higher than desired, resulting in degraded overall performance of the system particularly during exposure to ambient operating conditions.

In prior art systems, input glass ferrules employ one of two major designs. Either a single capillary of elliptical cross section or separate circular capillaries have been used, each with relatively short (1.8 mm) fiber-receiving ends. With such input ferrules, the optical fiber is subjected to a S-bending over the short conical end portion which typically exceeds 50% of the fiber diameter (for a fiber having a 125 $\mu$m diameter on a span of about 12 to 15 diameters in length. This excessive micro bending increases the insertion losses, Although the dual-capillary design reduces the lateral deflection of fiber interconnects compared to the elliptical single-capillary design, the short length of the cone end of such ferrules cannot reduce the micro-bending of the fiber and its inherent insertion loss. Fiber-ferrules subassemblies employing such ferrules are manufactured by the following steps of: fabricating the ferrules to hold the optical fibers (1); inserting the optical fibers stripped of their polymer coating into the respective ferrule capillaries (2); epoxy bonding them into the ferrule capillaries, including the conical end portions (3); grinding an 8° facet of the fiber-ferrule (4); polishing the facet (5) and depositing on the polished surface an antireflection (AR) coating. Once finished, the fiber-ferrule is aligned and assembled with the GRIN or ball lens collimator, whose surface is coated with anti-reflection (AR) films, and then embedded into the insulating glass tube, which, in turn, is protected by a metal housing to provide structural integrity, robustness and thermal insulation to the assembly.

There are two different technical solutions used in the design of bonds securing the components of a filter assembly. A low compliance bond between thermally well matched fibers and the ferrule is an approach commonly used by a majority of manufacturers. The adhesives used are heat-curable epoxies with high Young's modulus (E>100,00 psi) and moderate to high thermal expansion coefficients ($\alpha$=40–60 $10^{-6\circ}$ C.$^{-1}$). A typical example would be 353 ND EPO-TEK epoxy adhesive. In addition, the bond thickness used is very small.

Silicon adhesives are used to bond thermally mismatched glass tubes with metal housings and glass filters with metal holders. In these joints, a high compliance design is used. The silicones, which can be cured between 20–150° C. in the presence of moisture, are typically characterized by an extremely low Young's modulus (E<500 psi) and high thermal expansion ($\alpha$=180–250 $10^{-6\circ}$ C.$^{-1}$). A typical example would be DC 577 silicone, which can be used to bond a metal filter holder to a GRIN lens.

Adhesive bonding with subsequent soldering or welding is required to encapsulate a filtering assembly into a three-port package or DWDM device. A precise alignment achieved during initial assembly of a filter prior to final packaging can be easily decreased due to the high temperature thermal cycles associated with soldering or welding during packaging of the component. Such prior art manufacturing processes and resulting components have several problems resulting from the fact that the optical components experience stresses due to the thermal contraction mismatch between the glass and metal materials; polymerization shrinkage in adhesive bonds; and structural constraints induced by bonding and final soldering during encapsulation. These stresses lead to displacements of optical components during bonding and soldering, resulting in 0.3–1 dB increase in the insertion loss.

Such a filter package enclosure, which is typically formed of six to eight concentric protective units, has micron transverse tolerances. Maintaining these tolerances requires precision machining, time-consuming alignment, and soldering with frequent rework. As a result of these limitations, the optical performance specifications are lowered and cost is increased. As an example, soldering typically includes several re-flow cycles. This induces local thermal stresses in the nearby adhesive bonds and leads to the degradation of the polymer adhesive, resulting in repositioning of optical components and a shift in the spectral filter performance. With such designs, soldering may also result in the contamination of optical components through direct contact with molten solder and/or flux.

Although both the collimating subassemblies and housings are cylinders, the alignment of commercially available optical components, which exhibit a random distribution of optical and structural characteristics, requires some lateral and angular repositioning of the subassemblies. This repositioning of the optical subassemblies is limited by the gap in the solder joint and the ratio of this gap to the length of the subassembly. The lateral and angular repositioning observed in some isolators can be as high as 0.05–0.3 mm and 0.5–1.5°, respectively. The soldering of non-capillary gaps meets well-known difficulties, such as high volume shrinkage of the solder, void formation, and contamination of optical components.

However, for many applications, it is desirable to obtain a high accuracy thermally compensated filtering or isolating three-port package that can be relatively inexpensive and reliable. Additionally, a package design should be adequate not only to mechanically protect the fragile optical components but also to compensate for and minimize the thermally induced shift in spectral performance. Thus, there exists a need for a process for manufacturing a filtering (or isolating) three-port package, which has a construction which is miniaturized, has a low insertion loss, is inexpensive to manufacture, and which results in a filter having reliable, long-term operation.

SUMMARY OF THE INVENTION

The present invention provides an improved optical filter assembly which provides a lower insertion loss, preferably below about 0.1 dB and allows the assembly of the optical components, such as an input ferrule, collimating lens and filter, utilizing bonding adhesives which allows the alignment of the individual components relative to one anther through an improved input ferrule and filter holder, which permits the utilization of UV and thermally curable adhesives and improved thermal curing to greatly reduce relevant internal stresses in the subassembly so formed.

Methods embodying the present invention include the steps of actively aligning a filter holder and filter to a collimator assembly including a GRIN lens mounted thereto, axially separating the filter holder and GRIN lens, in a movable fixture, placing a UV and thermally curable adhesive on the periphery of the GRIN lens, moving the GRIN lens into engagement with a filter holder having a filter mounted therein, adjusting the collimator assembly with respect to the filter holder while monitoring the input and output signals of the optical fibers coupled to the GRIN lens for insertion loss less than about 0.1 dB, and applying UV radiation through the filter end of the filter holder to initially cure the aligned subassembly. In a preferred embodiment of the invention, the subassembly is subsequently thermally cured through an accelerated dark cure sequence followed by thermal curing. In another embodiment of the invention, UV radiation is applied to the filter holder GRIN lens interface through one or more apertures formed in the side of the filter holder which overlap the GRIN lens. The light source may be dithered such that UV radiation uniformly covers the cylindrical interface between the holder and the outer surface of the GRIN lens. In a preferred embodiment of the invention, the filter and GRIN lens are prealigned prior to the application of adhesive by monitoring the input and output signals of the filter while adjusting the X-Y positioning for a maximum detected signal.

In a preferred method of manufacturing also, subsequent to the UV curing, the assembly is cured through a stress relaxation cycle at about 40–50° C. for one to two hours followed by a thermal curing cycle of about 95° C. for one to two hours.

In one embodiment of the invention, an input ferrule is employed with an input cone having an axial length greater than about 3 mm to reduce S-bending of input fiber, thereby minimizing resultant insertion losses. In another embodiment of the invention, a generally cylindrical filter holder having an annular seat formed in one end for receiving a filter and a lens-receiving aperture at an opposite end having an internal dimension which allows micro-tilting of the filter holder to provide an alignment at an angle of less than about 0.1° to the axis of the GRIN lens. In one embodiment, the filter holder includes apertures, such as radially extending slots spaced around the periphery of the holder, to permit uniform UV curing of a UV and thermally curable bonding adhesive which, after adjusting for minimum insertion loss, secures the filter holder in the GRIN lens. An optical filter of a preferred embodiment of the present invention includes such an improved ferrule and/or a filter holder coupled in alignment with one another in a suitable housing.

The manufacturing method and filter assembly of the present invention, therefore, provides an improved performance filter utilizing a unique input ferrule, filter holder, and an assembly method for providing a low cost, highly reliable, and improved performance filter assembly, such as a three-port filter which can be used in an optical communication system.

Additional features and advantages of the invention will be set forth in the detailed description which follows and will be apparent to those skilled in the art from the description or recognized by practicing the invention as described in the description which follows together with the claims and appended drawings.

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description serve to explain the principals and operation of the invention.

DETAILED DESCRIPTION OF THE PREFERRED EMBODIMENT

Figure 1:
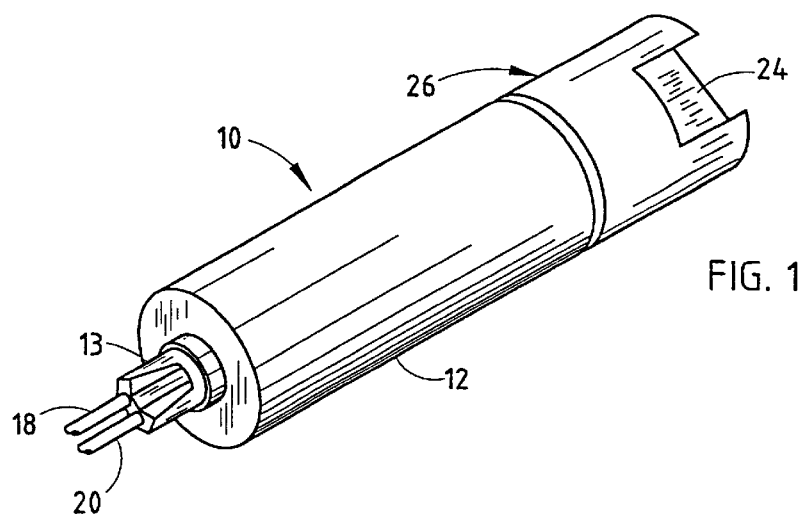
FIG. 1 is a perspective view of a filter subassembly embodying the present invention.
Figure 2:
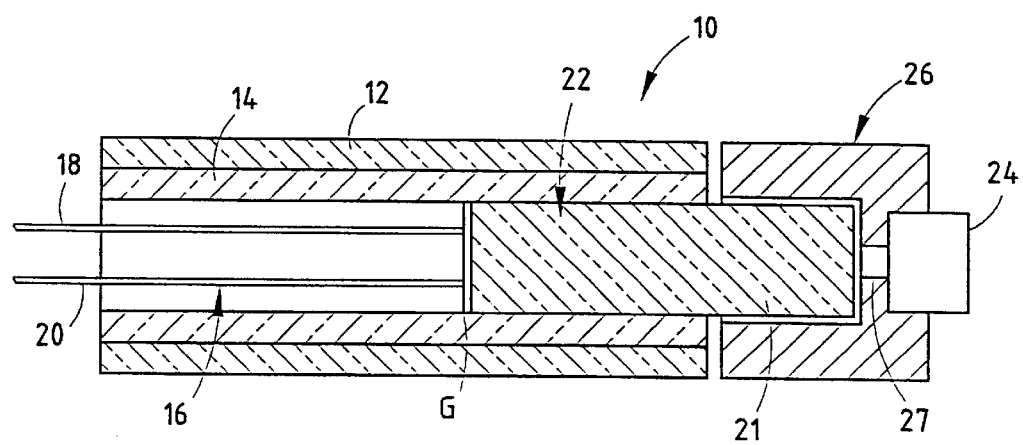
FIG. 2 is a partial vertical cross-sectional schematic view of the subassembly shown in FIG. 1.

Referring initially to FIGS. 1 and 2, a brief description of a filter subassembly 10 is first presented. Filter subassembly 10 is for a three-port filter and includes an outer cylindrical metal housing 12, which is crimped at 13 (FIG. 1) around input and reflection optical fibers 18 and 20. Housing 12 surrounds an insulating cylindrical boro-silicate sleeve 14 within which there is mounted a dual capillary glass ferrule 16 receiving an input optical fiber 18 and a reflective optical fiber 20. The ends of fibers 18 and 20 in ferrule 16 face a GRIN lens 22, which has polished facets at its left end (as seen in FIG. 2) which face and, as described below, align with the ends of optical fibers 18, 20 held in place by ferrule 16. Lens 22 collimates light from input fiber 18 into parallel rays, transmitting them to a filter 24 which may be a shaping filter, an isolating filter, or any other spectrally modifying filter. A filter holder 26 is mounted to the end 21 of GRIN lens 22 according to the method of the present invention and includes an axial aperture 27 allowing light from GRIN lens 22 to impinge upon filter 24 and the reflective light to be directed to reflective optical fiber 20. Lens holder 26 also receives filter 24 in alignment with GRIN lens 22 with aperture 27 extending between the filter 24 and lens 22.

Figure 3:
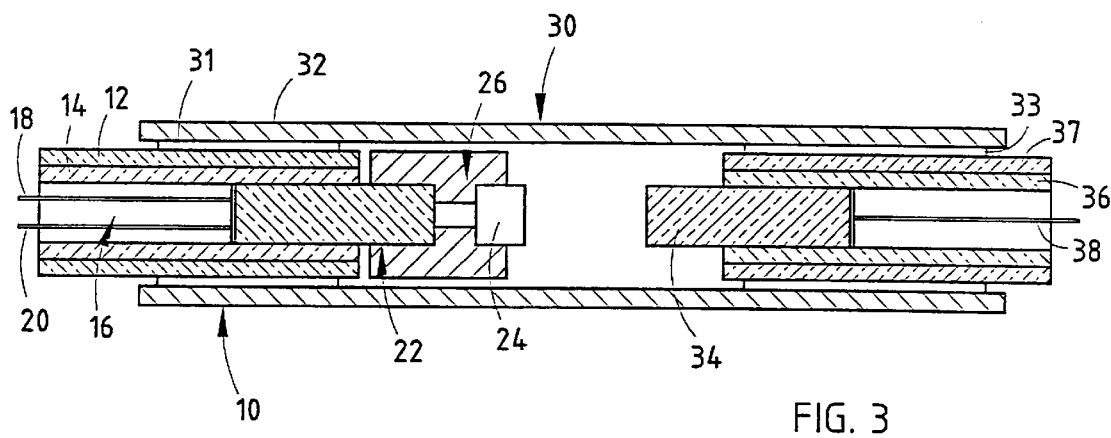
FIG. 3 is a vertical cross-sectional schematic view of a three-port filter assembly embodying the present invention.

Before describing the manufacture of the subassembly 10 forming a part of an overall three-port filter, a three-port filter 30 is briefly described. As shown in FIG. 3, filter 30 includes an outer cylindrical metal sleeve 32 into which subassembly 10 is mounted and secured by a cylindrical interface of solder and/or welding material 31 as seen in the schematic diagram of FIG. 3, The output signal from filter 24 is received by an aligned collimating GRIN lens 34 similarly secured within a boro-silicate sleeve 36 surrounded by a metal sleeve 37 which, in turn, is mounted within the outer protective sleeve 32 utilizing a cylindrical solder interface 33. An output optical fiber 38 couples the desired wavelength output signal from three-port filter 30 so formed to the communication link in which the filter is installed. Thus, for example, the filter 30 may be employed to receive a plurality of wavelengths from input optical fiber 18 pass a single output wavelength at output fiber 38 and return the remaining signal wavelengths to reflective optical fiber 20. The packaging of subassembly 10 and collimating lens 34 within the sleeve 32 can be conventional and is well-known to those skilled in the art. The method of assembling subassembly 10 and its structural elements, however, are unique and is now described in detail.

Figure 4:
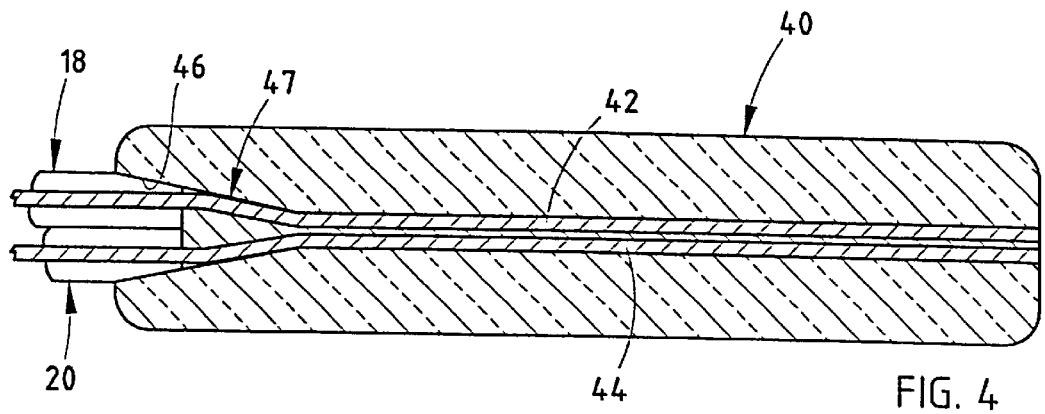
FIGS. 4 and 4a are an enlarged vertical cross-sectional and right end view, respectively, of a prior art ferrule employed in a prior art filter assembly.

One problem associated with prior art three-port filters is illustrated by drawing FIG. 4, showing a vertical schematic cross-sectional view of a prior art input ferrule 40. Ferrule 40 is made of a conventional glass material such as silica and includes a pair of spaced-apart capillary tubes 42 and 44 having a diameter sufficient to receive the stripped input and output optical fibers 18 and 20 having a diameter of about 125$\mu$. The overall diameter, however, of the optical fibers 18 and 20 includes a protective polymeric sheath and is approximately 250$\mu$. The optical fibers 18 and 20 are cemented within the conical input section 46 of the prior art ferrule 40 utilizing a standard bonding adhesive providing a strain-relief connection of the coated fibers 18 and 20 within the glass ferrule. As the stripped optical fibers 18 and 20 exit the polymeric sheath and enter the capillary tubes 42 and 44 over the length of 1.8 mm of the conical input section 46, they are bent at area 47 schematically shown in FIG. 2. This S-bending of the optical fibers interconnection to the ferrule 40 results in deflection of the fiber which exceeds 50% of the fiber diameter. This induced micro-bending of the fiber increases insertion loss of the signals applied to the GRIN lens 22 due to the geometry of ferrule 40.

Figure 4A:
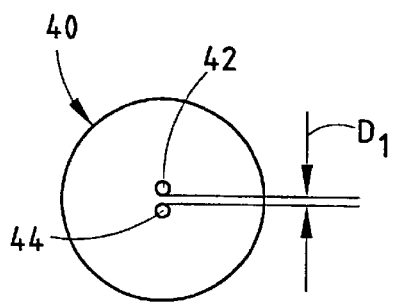

The capillary tubes 42 and 44 of ferrule 40 are spaced apart a distance "D1", as shown in FIG. 4a, of about 0.06 mm, which with the coned length provided by prior art ferrules as shown in FIG. 4, results in such excessive micro-bending of the optical fibers and resultant insertion losses. The alternate ferrule construction in which a single elliptical capillary is provided for receiving adjacent optical fibers and having a similar input cone construction suffers even more from the bending problem. In order to greatly reduce the insertion loss due to the undesirable S-bending of input fibers, an improved ferrule 16 of the present invention, which forms part of the subassembly 10 as seen in FIGS. 1 and 2, is employed and is described in FIGS. 5 and 5a.

Figure 5:
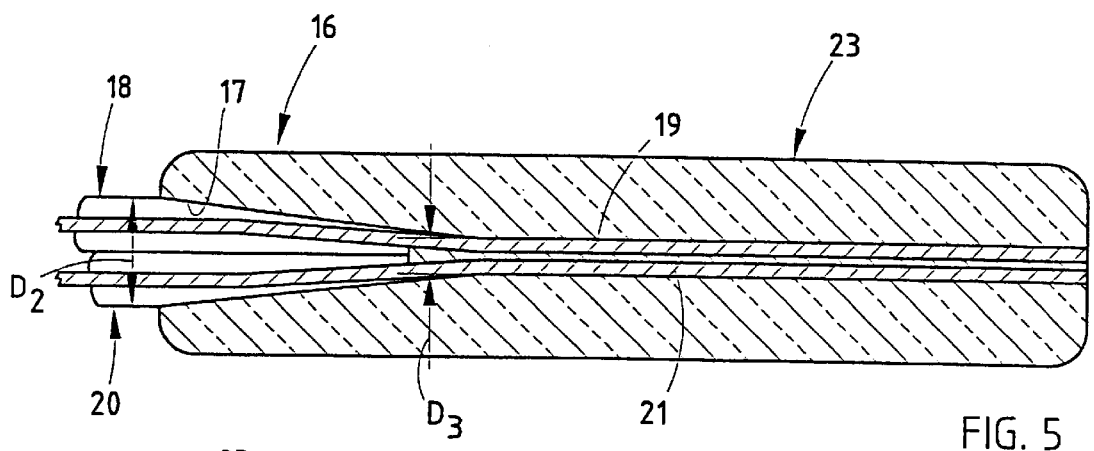
FIGS. 5 and 5a are an enlarged vertical cross-sectional view and right end view, respectively, of a ferrule employed in the filter subassembly of FIGS. 1 and 2 and the filter of FIG. 3.
Figure 5A:
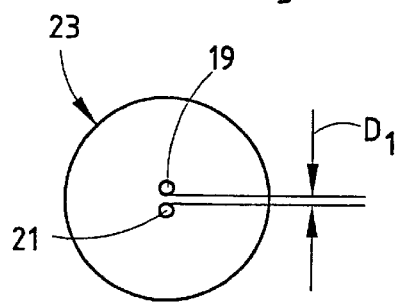

In FIG. 5, a ferrule 16 is shown which has an input cone 17 with an axial length in the preferred embodiment in excess of 3 mm and preferably 3.4 mm or approximately twice the length of prior art input cones. The input diameter "D2" of input cone 17 is approximately 0.62 mm to accommodate the 500 mm combined diameter of input fibers 18 and reflective fiber 20 and allow room for epoxy to bond the fibers within cone 17. The exit diameter "D3" of cone 17 adjacent capillaries 19 and 21, which receive and secure the optical fibers 18 and 20 therein, is approximately 0.32 mm which accommodates the 0.06 mm spacing D1 between the fibers and the 125$\mu$ diameters of each of the stripped input and reflective fibers, allowing 0.01 mm spacing at the input to capillary tubes 19 and 21 for epoxy to securely seat the input and output fibers within ferrule 16. By expanding the axial length "L" of cone 17 to nearly twice that of prior art input ferrules, S-bending is substantially avoided, providing substantially a nearly equal optical path length for both the input and reflective fibers and reducing insertion losses.

The fibers are epoxied within the ferrule 16 with 353NG EPO-TEK Incorporated epoxy adhesive. The fiber ferrule is then pre-cured at room temperature conditions for about eight to ten hours to outgas the assembly. Next, it is cured at 110° C. for one and one-half hours and finally post-cured at 125–130° C. for one-half hour to reduce moisture absorption. The end 23 of the ferrule and the optical fibers are polished into an elliptical surface within approximately 8° to correspond to the facing end of GRIN lens 22. Ferrule 16 is then cemented within the surrounding glass sleeve 14 (FIG. 2). Prior to the insertion of the ferrule 16 in sleeve 14, the GRIN lens 22 has been installed and cemented in place. The ferrule is aligned with a gap "G" (FIG. 2) of about 1 to 1.5$\mu$ between the ends of the GRIN lens and the ferrule to allow the axial and rotational active alignment of the ferrule to the GRIN lens by rotating the ferrule within sleeve 14 and axially positioning it to accommodate the surface tolerance of the GRIN lens, which may run between 7.8° to 8.1°. A signal is applied to the input fiber 18 while monitoring the output of the GRIN lens within sleeve 14. This assures the minimum insertion loss and maximum signal coupling between the optical fibers and the collimating GRIN lens 22, which subsequently receives the filter holder and filter therein as now described in connection with FIG. 6.

Figure 6:
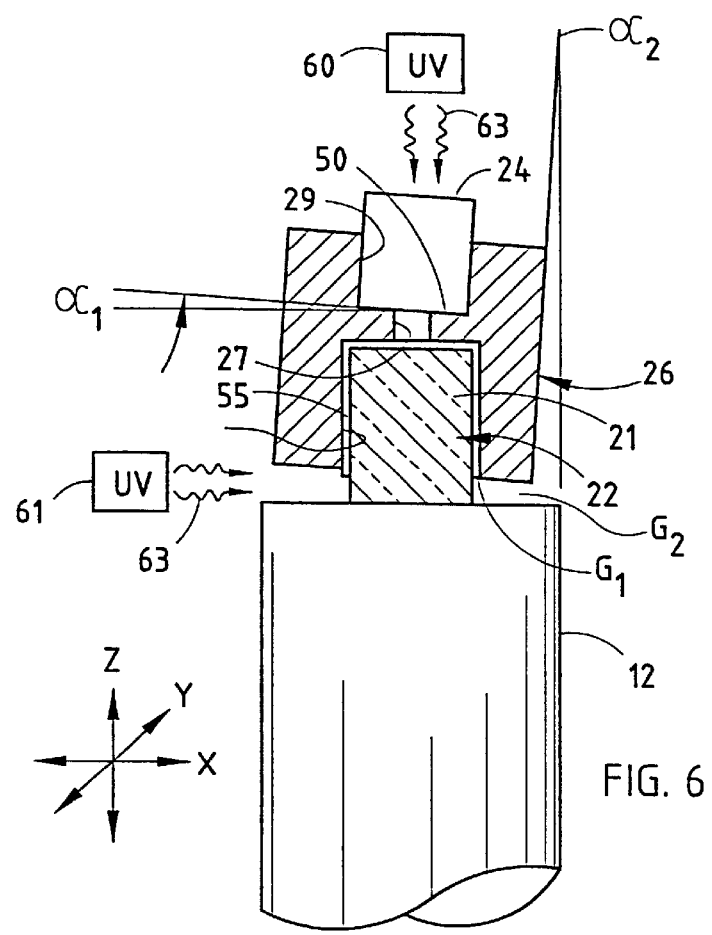
FIG. 6 is an enlarged vertical cross-sectional schematic view of an improved filter holder of the present invention also illustrating its method of assembly.

Referring now to FIG. 6, the subsequent positioning of the filter 24 and filter holder 26 onto end 21 of the GRIN lens is described. The filter holder 26 departs from prior art filter holders in that it has a somewhat larger diameter cylindrical aperture 25 at its lower end, as seen in FIG. 6, which overlies the cylindrical diameter of GRIN lens 22, providing a gap G1 surrounding end 21 of GRIN lens 22 of about 50$\mu$. This, as described below, allows the micro-tilting of the filter holder 26 with respect to the GRIN lens 22 for precisely aligning the filter 24 and GRIN lens 22 while accommodating the bonding adhesive employed for securing the filter holder to the GRIN lens. Holder 26 is made of a material which has a coefficient of thermal expansion which is similar to that of the GRIN lens and, in a preferred embodiment of the invention, comprised a machined stainless steel member made of SS 17-4-PH stainless steel. Prior to assembling of the filter holder to the GRIN lens, the filter 24 is mounted within the filter holder 26, which has a cylindrical aperture 29 with a seat 50 canted at an angle $\theta_1$ (FIG. 6) of approximately 1.5° to 2° and preferably about 1.8° to accommodate the from about 0.3° to 0.7° angular discrepancy between the front and rear surfaces of a typical filter cube 24. The filter 24 is secured within cylindrical aperture 29 utilizing conventional silicone bonding adhesives, such as DC577, and the filter cube can be any conventional, commercially available filter having dimension of, for example, 1.4 by 1.5 mm. These filters consist of a glass substrate with multi-layered dielectric films to reflect desired optical wavelength signals while passing selected optical wavelength signals or may have any other desired optical characteristics, depending upon the use of the filter in a communication or other system.

With the filter in place in filter holder 26, the holder is clamped in a vertically (as seen in FIG. 6) movable clamp which can also be rotated such that the filter holder can be moved into and out of engagement with the GRIN lens as well as rotated in directions indicated by arrow A for actively aligning the optical axis of the filter to the lateral surface of the GRIN lens to minimize insertion loss. This is achieved by applying a signal at about 1550 nm to input fiber 18 (FIGS. 1–3) while monitoring the reflected signal on fiber 20. The filter holder is then tilted in orthogonal directions and rotated in increments of about 2° to 5° as necessary to achieve minimum insertion loss as determined by monitoring the input and output signals. Once the optimum angular position of the filter holder to GRIN lens is determined, the filter holder 26 is raised axially away from the GRIN lens (while maintaining the angular relationship) to allow access to the side wall of lens 22.

The GRIN lens and its sleeve 12 are mounted in an XYZ micro-adjustable stage of conventional construction to hold the projecting end of GRIN lens 22 under cavity 25 of holder 26. While separated, one or more and preferably a few drops of bonding adhesive is positioned on the outer peripheral circumferential surface of the end 21 of GRIN lens 22, with care being taken not to touch drops of the epoxy adhesive to the lens surface of the GRIN lens. The filter holder is then lowered over the GRIN lens, wiping the adhesive in the annular space between cavity 25 and lens 22. Next, the XZ axis of the stage is adjusted while monitoring signals applied to the input and output optical fibers 18 and 20 to assure a minimum insertion loss. The YZ axis of the stage is then adjusted while monitoring the signals to assure a minimum insertion loss of no greater than about 0.03 dB. A variety of UV and thermally curable epoxies were tested, and it was determined that the bonding adhesive which worked unexpectedly well was commercially available EMI-3410, which is a UV and thermal curable adhesive. Other UV and thermally curable adhesives, such as Corning MCA 80 or Corning MCA 95, could also be employed.

By providing a gap of approximately 50μ between the inner surface of cylindrical aperture 25 of lens holder 26 and the outer diameter of GRIN lens 22, the optical axis of the lens and filter can be precisely aligned with the longitudinal axis of the filter holder 26 and that of the GRIN lens 24 being adjustable within an angle $\theta_2$ of less than about 0.7°, as shown in FIG. 6. This active alignment of the GRIN lens and filter holder 26 is achieved by the movement of the GRIN lens in the XZ and YZ planes, as shown in FIG. 6, utilizing a standard micro-stage. In one embodiment of the invention, one or more sources of ultra violet radiation such as a source 60 and 61 are employed to expose the bonding adhesive at the interface between holder 26 and GRIN lens 22 to ultraviolet radiation to cure the bonding adhesive sufficiently such that the desired relationship between the lens 22 and filter 24 is fixed until the adhesive is finally cured.

Figure 7:
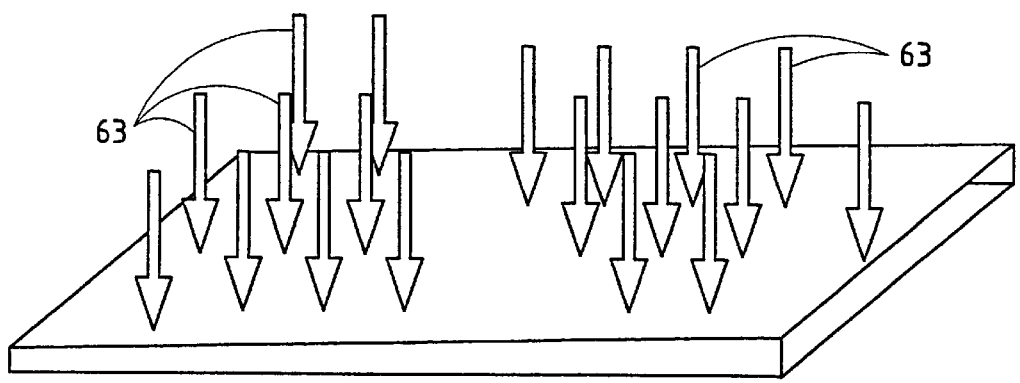
FIG. 7 is a schematic view illustrating the frontal polymerization of a UV or thermally curable bonding adhesive when UV light is propagated transversely through a filter, as illustrated in FIG. 6.

As seen by the diagram of FIG. 7, by injecting ultra violet radiation from source 60 into the exposed end of filter 24, ultra violet radiation (indicated at 63) is dispersed as the UV radiation propagates transversely through the filter and into the adhesive layer 55 (FIG. 6), causing frontal polymerization of the adhesive due to UV light propagating through the filter. In most instances, the UV radiation 63 from source 60 through filter 24 will, upon an exposure of about 20 seconds at a distance of about 2.5 cm between the source and the filter 24 result in sufficient UV curing of the adhesive to fix the filter holder to the GRIN lens. In addition to exposing the adhesive 55 through filter 24 utilizing a UV light source 60, an additional UV light source 61 can be employed to direct UV radiation 63 through the gap G2 between the lower annular end of filter holder 26 and the top annular surface of sleeve 12 with 40 second exposures for a total exposure of about 100 seconds of UV radiation to cure the adhesive in the annular area of gap G1 at the lower end of filter holder 26. After the UV curing, which tends to temporarily induce stresses typically of from 200 to 300 psi or higher in the subassembly, thermal stress release and curing is provided as described below. Before such curing, however, input and output signals are monitored to assure that the input insertion loss remains less than 0.05 dB. The UV from light source 61 can be rotated around the periphery of the subassembly during successive exposures.

Figure 8:
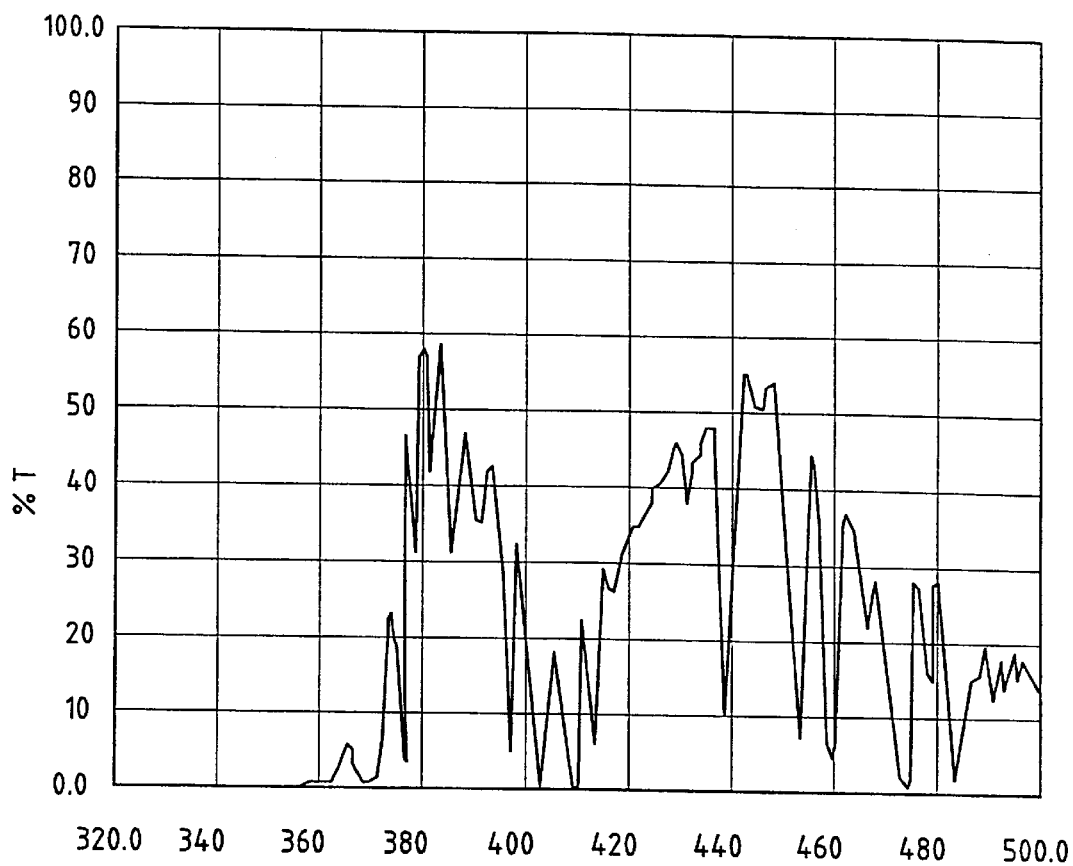
FIG. 8 illustrates the spectrum of a mercury light source showing a significant portion of the UV light spectrum.
Figure 9:
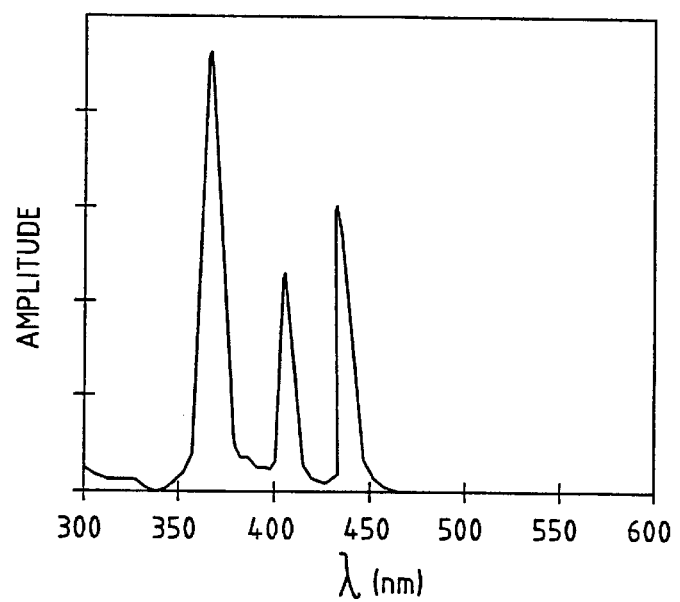
FIG. 9 is the measured UV-transmission spectrum of a Corning Marlborough 1.4×1.4×1.5 mm bulk filter used in the structure shown in FIGS. 1, 2, 3 and 6.

The UV sources 60 and 61 have spectral emissions, as illustrated in FIG. 8, which shows the spectrum of a mercury light source. FIG. 9 illustrates the experimentally determined UV transmission spectrum of such a light source through a Corning Marlborough bulk filter. The convolution of these spectra indicates that a significant portion of the UV light spectrum propagates to the bond layer through the filter 24 and that the duration of the UV cure cycle results in a nearly zero change of insertion loss over a period for from 630 to 700 seconds. The UV initiated cure induces initial stresses due to polymerization shrinkage. For a typically highly filled epoxy adhesive with a limited volume of shrinkage (on the order of 1%), the induced stress can be as high as 300 to 600 psi. The stresses induced by the UV curing, which fixes the alignment of the filter to the GRIN lens, are relieved and the bonding adhesive 55 further cured during thermal curing of the subassembly 10 in a conventional oven which is controlled to provide the stress relief and thermal cure cycles as illustrated in FIG. 10.

Figure 10:
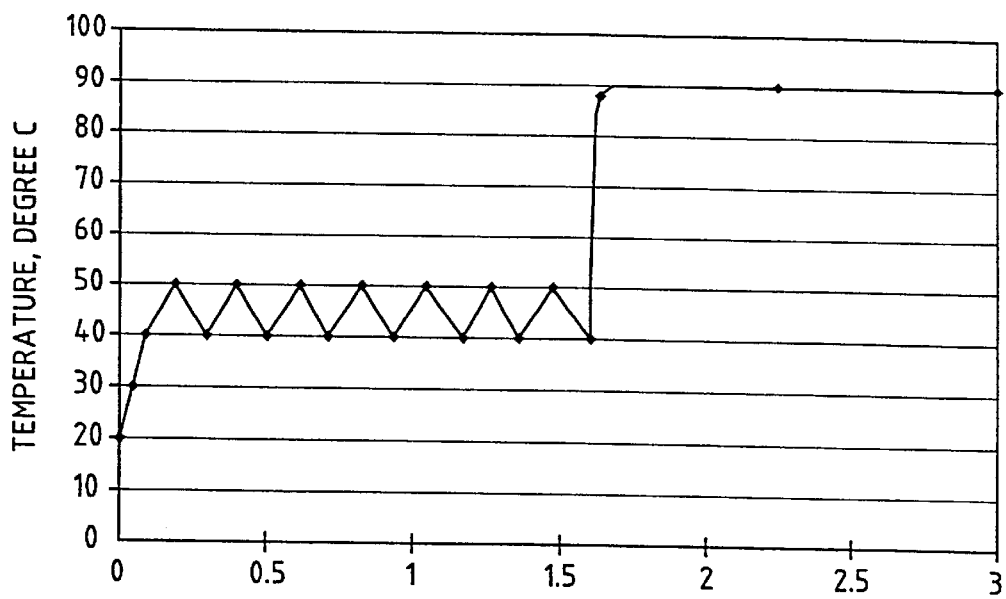
FIG. 10 is a graph of the accelerated dark cure and thermal cure of the subassembly shown in FIG. 6.

The graph of FIG. 10 illustrates an accelerated dark cure in an oven which is controlled to provide several short thermal cycles at an elevated temperature not exceeding 50% of the minimum temperature of thermal cure. The cycle typically starts at room temperature, and the temperature is increased to cycle between about 40° and about 50° C. over ten to fifteen cycles per hour for a total period of approximately one and one-half to four hours. The thermal cycling induces the variable mismatch stresses in the glass, metal filter holder, and the adhesive. Although the rate of stress relaxation in the adhesive increases with an increase in the mismatch stresses, this stress level is limited by the allowable elastic limits. These cyclic changes in temperature induce the creep in adhesive that leads to the additionally accelerated stress relaxation. By cycling the temperature as shown in FIG. 10, the typically 12 to 24 hour room temperature dark cure is reduced to about one to two hours. In this case, any thermally induced repositioning of optical components is drastically reduced.

As seen in FIG. 10 after the dark cure, the assembly is subjected to a final thermal cure for about two to about two and one-half hours at a temperature of from about 85° to about 90° in the case of the preferred EMI-3410 adhesive. By utilizing the thermal curing cycle illustrated in FIG. 10, the elevated temperature induces a thermal mismatch stress in addition to the existing shrinkage stresses. When the combined stresses are less than the isochronous elastic limit of the adhesive material, the accelerated stress relaxation occurs with no irreversible deformation in the bond. This effect is substantially improved with increasing the number of thermal cycles during the dark cure (ie., initial) portion of the thermal cure cycle.

Figure 11:
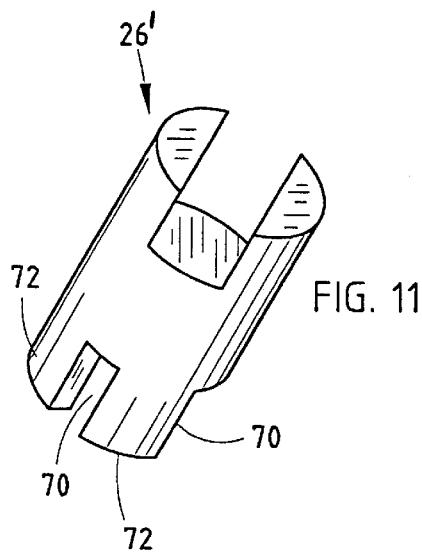
FIG. 11 is a perspective view of an alternative embodiment of a filter holder embodying one aspect of the present invention.
Figure 12:
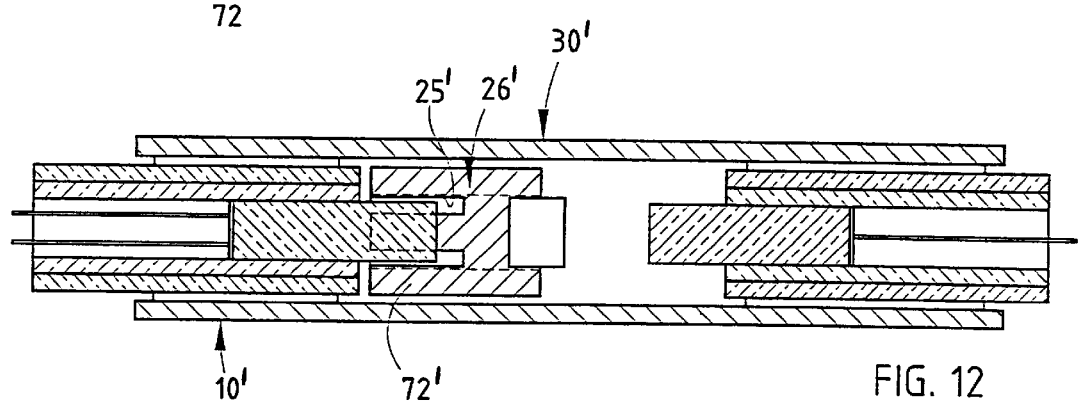
FIG. 12 is a vertical cross-sectional schematic view of a three-port filter employing the filter holder shown in FIG. 11.

Although the utilization of the UV light source 60 directing radiation 63 through filter 24 provides the desired initial UV curing of the adhesive bond between the filter holder and GRIN lens, the filter holder can be modified, as seen in FIGS. 11 and 12, to provide additional axial exposure ports for exposure by UV radiation from radial source 61 (as seen in FIG. 6) to improve the dispersion of UV radiation through the bonding adhesive 55.

As shown in FIG. 11, a filter holder 26' is shown, which is substantially identical to filter holder 26 with respect to the provision of a cylindrical gap by its lower cylindrical aperture 25' for adjustment of the filter holder to the GRIN lens; however, the lower end of filter holder 26' includes a plurality of apertures such as longitudinally extending, radially inwardly projecting slots 70 spaced around the periphery of the filter holder and communicating with cylindrical opening 25' within the filter holder 26'. Once a filter 24 is mounted in place as described above in connection with filter holder 26, holder 26' receives epoxy as in the previously described embodiment, and the GRIN lens is raised and adjusted with respect to filter 24 contained within filter holder 26' in the same manner as in the first embodiment. The light source 61, however, is moved around the periphery of the filter holder 26' directing UV radiation into slots 70 defining downwardly projecting, spaced apart legs 72 between such slots such that UV radiation is dithered into the cylindrical side walls of GRIN lens 22 which serves to further disperse the UV radiation a uniformly within the annular space containing bonding adhesive 55. By providing spaced radially extending elongated slots 70 or other suitably shaped apertures extending through the side wall of the lower section of filter holder 26' a light path is provided for UV radiation to the inner cylindrical aperture 25' receiving the end of GRIN lens 22. In one embodiment, four slots 70 spaced at 90° intervals around the lower section of holder 26' were provided. This results in improved uniform UV exposure to facilitate the UV curing of adhesive 55. In this embodiment, it is unnecessary to expose the bonding adhesive utilizing a light source 60 through the filter since the bonding adhesive is uniformly exposed utilizing radiation from light source 61. Once the subassembly 10', as shown in FIG. 12, is completed, it is assembled into the resultant three-port filter 30' in a conventional manner.

It will become apparent to those skilled in the art that various modifications to the preferred embodiment of the invention as described herein can be made without departing from the spirit or scope of the invention as defined by the appended claims.

The invention claimed is:

1. A method of assembling a three-port filter including the steps of:
    positioning a collimator assembly including a GRIN lens and input and reflective optical fibers mounted thereto in a movable fixture;
    actively aligning the tip and tilt angles of the GRIN lens with respect to the filter holder while monitoring signals of the optical fibers coupled to the collimator assembly to achieve an aligned position with minimum insertion loss;
    axially displacing the filter holder and GRIN lens from one another while maintaining the lateral and angular alignment between them;
    placing a UV and thermally curable adhesive on an outer peripheral surface of the GRIN lens;
    axially moving the filter holder back to its optimum axial position relative to the GRIN lens; and
    applying UV radiation through the filter end of the filter holder to initially cure the adhesive securing the filter holder to the GRIN lens to form a filter subassembly.

2. The method as defined in claim 1 wherein said actively aligning step comprises:
    applying an input signal on said input optical fiber;
    monitoring output signals on said reflective optical fiber; and
    adjusting said filter assembly with respect to said collimator assembly in an alignment stage with five degrees of freedom including lateral x, lateral y, tip, tilt, and axial rotation, until a maximum reflected signal is detected.

3. The method as defined in claim 2 and further including the step of an accelerated stress relaxation.

4. The method as defined in claim 3 wherein said accelerated stress relaxation sequence comprises cycling the subassembly in an oven at temperatures varying between about 40° and about 50° C. for about one and one-half to about four hours.

5. The method as defined in claim 4 wherein about 10 to about 15 thermal cycles per hour are provided during said accelerated stress relaxation.

6. The method as defined in claim 5 and wherein said subassembly is subjected to a thermal curing cycle after said accelerated stress relaxation for from about one to about two hours at about 95° C.

7. A dual-fiber ferrule for a three-port filter comprising:
    an elongated, generally cylindrical glass body having a pair of spaced-apart capillaries extending therethrough for receiving a pair of optical fibers, said capillaries including a mutual conically shaped aperture extending to one end of the ferrule, wherein the axial length of said mutual conically shaped aperture is greater than about 3 mm to reduce S-bending of said pair of optical fibers inserted into said ferrule for minimizing resultant insertion losses.

8. The dual fiber ferrule as defined in claim 7 wherein the axial length of said mutual conically shaped aperture is about 3.4 mm.

9. The dual fiber ferrule as defined in claim 8 wherein the input diameter of said mutual conically shaped aperture is about 0.62 mm and the exit diameter is about 0.32 mm.

10. A filter holder for a three-port filter comprising:
    a metal body having an annular seat formed in one end for receiving a filter; and
    an opening at its opposite end, wide enough to receive a GRIN lens. Said opening having an internal dimension which allows micro-tilting of the filter holder to provide an alignment at an angle of up to about 3° off the axis of a GRIN lens.

11. The filter holder as defined in claim 10 wherein said body has at least one radially extending aperture formed through the periphery of said holder body and communicating with said lens-receiving opening to permit uniform UV curing of a UV or thermally curable bonding adhesive between the filter holder and the GRIN lens.

12. The filter holder as defined in claim 11 wherein said body is manufactured from an alloy that matches the GRIN lens in its thermal expansion coefficient.

13. The filter holder as defined in claim 12 wherein said body is made of a low expansion stainless steel.

14. The filter holder as defined in claim 13 wherein said stainless steel is SS 17-4-PH.

15. The filter holder as defined in claim 10 wherein said lens-receiving opening is cylindrically shaped for receiving a GRIN lens therein and has a diameter about $100\mu$ greater than that of a GRIN lens to be inserted into said filter holder.

16. The filter holder as defined in claim 11 wherein said body has a plurality of spaced radially extending apertures around its body that communicate with said lens-receiving aperture to permit uniform UV curing of a UV or thermally curable bonding adhesive between the filter holder and the GRIN lens.

17. A method of curing an adhesive at the junction of a GRIN lens and a filter holder by means of UV radiation and heat treatment, comprising the steps of:

aligning a filter holder and GRIN lens in which a filter is bonded to said filter holder which has a metal body with an annular seat formed in one end for receiving a filter and an opening at its opposite end wide enough to receive a GRIN lens, said opening having an internal dimension which allows micro-tilting of the filter holder to provide an alignment at an angle of up to about 3° off the axis of a GRIN lens to the optical output of said GRIN lens;

placing a UV and thermally curable adhesive on an outer peripheral surface of said GRIN lens; and applying UV radiation to initially cure the adhesive securing the filter holder to the GRIN lens.

18. The method as defined in claim 17 wherein said UV radiation is provided through a plurality of radially extending apertures located in the portion of the filter holder body that overlaps with the GRIN lens.

19. The method as defined in claim 17 wherein said UV radiation is provided through the filter to initially cure the adhesive for holding the aligned filter holder and GRIN lens subassembly in place.

20. The method as defined in claim 17 and further including the steps of stress stabilizing the subassembly through an accelerated stress relaxation sequence followed by thermal curing.

21. The method as defined in claim 20 wherein said accelerated stress relaxation sequence comprises cycling the subassembly in an oven at temperatures varying between about 40° C. to about 50° C. for about one and one-half to about four hours.

22. The method as defined in claim 21 wherein about 10 to 15 thermal cycles per hour are provided during the stress relaxation sequence.

23. The method as defined in claim 22 and wherein said subassembly is subjected to a thermal curing cycle after said stress relaxation sequence at about 95° C. for from about one to about two hours.

24. A method of assembling a three-port filter including the steps of:

positioning and bonding two fibers into a dual capillary ferrule, which comprises two drawn capillaries that are positioned symmetrically with respect to the central axis of the ferrule;

polishing an end face facet of typically 8° and depositing an anti-reflective coating on the polished surface;

inserting and bonding a GRIN lens with an 8° angled input facet inside a thermally insulating glass tube;

inserting the preassembled dual-fiber ferrule into said thermally insulating glass tube;

aligning the end face facet of the dual fiber ferrule parallel to the GRIN lens input facet, and bonding it in the position of optimum alignment to form a dual fiber collimator assembly;

encapsulating said dual fiber collimator assembly with a metal sleeve;

bonding a filter into a metal holder to form a filter assembly;

actively aligning said filter assembly to said dual fiber collimator assembly by tilting the filter assembly in orthogonal directions, and rotating the filter assembly with respect to the collimator assembly while monitoring signals of the optical fibers coupled to the collimator assembly to achieve an aligned position with minimum insertion loss;

axially displacing the filter assembly and GRIN lens from one another while maintaining the lateral alignment between them;

placing a UV and thermally curable adhesive on an outer peripheral surface of the GRIN lens;

moving the filter assembly back into its former position of optimum axial alignment; and applying UV radiation through the filter end of the filter holder to provide an initial cure to the adhesive and securing the filter holder to the GRIN lens to form a collimator-filter assembly.

25. The method as defined in claim 24 wherein said positioning and bonding two fibers into a dual capillary ferrule comprises:

pre-curing the pre-assembled fiber-ferrule at room temperature conditions for about eight to ten hours;

curing said fiber-ferrule at 110° C. for one and one-half hours; and post-curing said fiber-ferrule at 125–130° C. for one-half hour.

* * * * *